No. 775,443. Patented November 22, 1904.

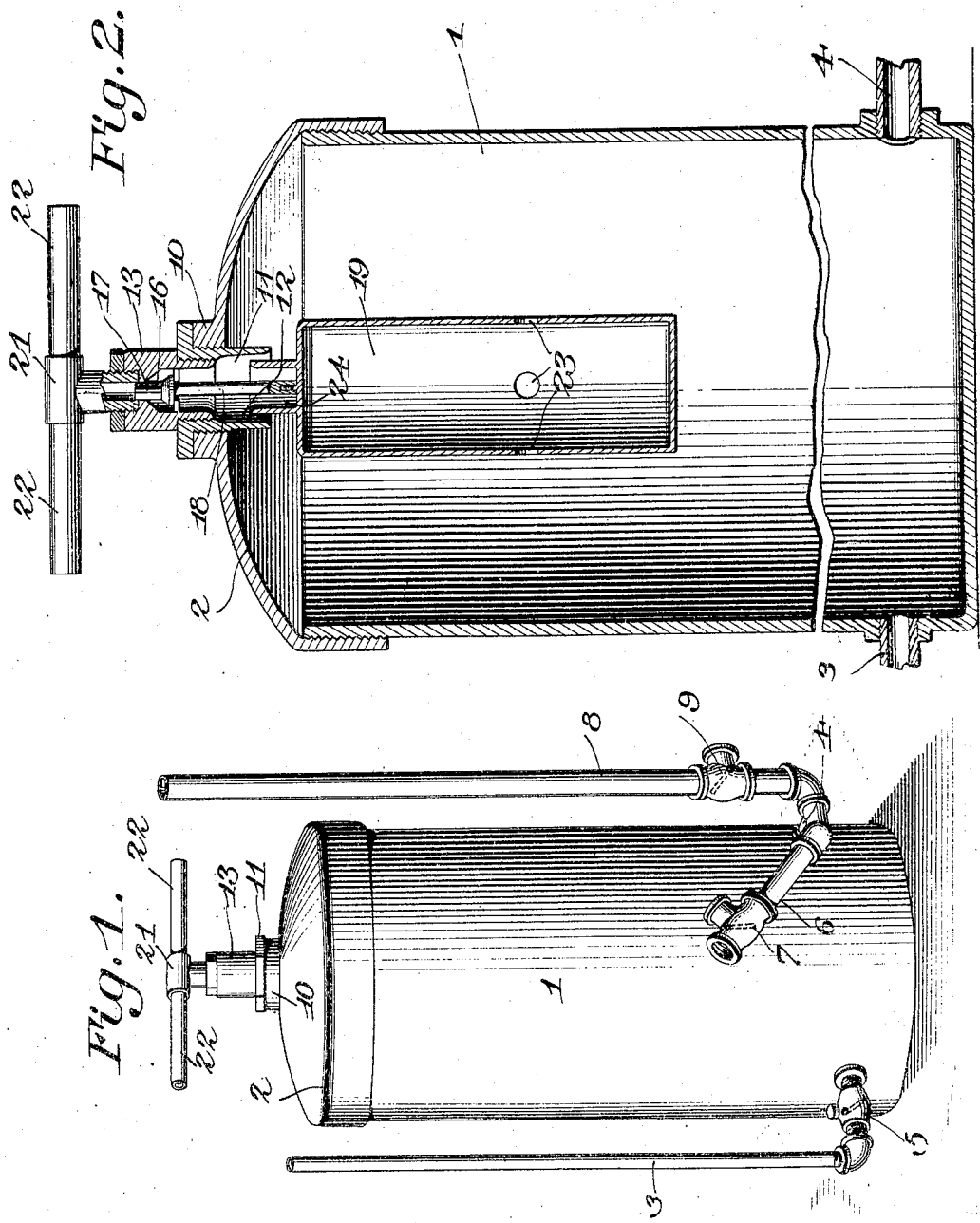

UNITED STATES PATENT OFFICE.

JOHN WESLEY CARPENTER, OF BRIDGEWATER, VIRGINIA.

WATER PURIFIER AND ELEVATOR.

SPECIFICATION forming part of Letters Patent No. 775,443, dated November 22, 1904.

Application filed June 14, 1904. Serial No. 212,551. (No model.)

*To all whom it may concern:*

Be it known that I, JOHN WESLEY CARPENTER, a citizen of the United States, residing at Bridgewater, in the county of Rockingham and State of Virginia, have invented a new and useful Water Purifier and Elevator, of which the following is a specification.

This invention relates to improvements in compressed-air water-elevators, and has for one of its objects to provide a novel form of water-elevating device in which provision is made for purifying the water in advance of its delivery to the point of consumption.

It is well known that oxygen is fatal to various forms of bacteria and micro-organisms, and in carrying out the present invention a portion of the air utilized for elevating the water is forced through the water to oxygenize and thus purify the same.

A further object of the invention is to provide a novel form of compressed-air water-elevator in which the air for forcing the water to an elevated point is first caused to bubble upward through the body of water in advance of the forcing of the water through the discharge-pipe.

A still further object of the invention is to provide a device of this character in which provision is made for the formation of a perfect water seal at the upper portion of the apparatus, so as to prevent the escape of any of the air during the discharge of the water.

With these and other objects in view, as will more fully hereinafter appear, the invention consists in the novel construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the drawings, Figure 1 is a perspective view of a water purifying and elevating device constructed in accordance with the invention. Fig. 2 is a transverse sectional elevation of the same.

The main casing 1 is provided with an upper removable cap-piece 2, and at the lower end of the casing is an inlet-pipe 3 for the entrance of air and a pipe 4, through which water enters and is discharged. The pipe 3 is provided with an inwardly-opening check-valve 5 and leads upward to any suitable source of supply. The pipe 4 communicates with a water-inlet pipe 6, having an inwardly-opening check-valve 7, that will open to permit the inflow of water to the cylinder under atmospheric pressure, it being understood that the device as a whole is submerged in a well or cistern from which the water is to be pumped to a point of consumption. The pipe 4 is further connected with a water-discharge pipe 8, having an upwardly-opening check-valve 9, and under normal conditions—that is to say, when water is entering the chamber 1—this valve will be closed; but when air is entering through the pipe 3 the check-valve 7 will be closed and the check-valve 9 will be opened in order to permit the water from the cylinder to pass upward through the pipe 8.

At the top of the cap 2 is an internally-threaded flange 10, into which is screwed a collar 11, having a depending annular flange 12, that forms one member of a water seal to be hereinafter described. The collar is threaded for the passage of a threaded valve-casing 13. The valve-casing has a seat for the reception of a disk valve 16, provided with the usual guiding means 17, and said valve is connected to a vertically-movable stem 18, that has a threaded connection with a hollow float 19. To the valve-casing is connected one member of a T 21, and to the oppositely-disposed horizontally-alining coupling members of the T are connected water-inlet and air-outlet pipes 22, said pipes being also arranged below the level of the water.

The float 19 is in the form of a sheet-metal cylinder of a height of about one-half of the height of the main casing, and in the walls of said cylinder are formed a number of water-inlet openings 23. At the top of the float is secured a vertically-extending annular flange 24, which when the float is buoyed upward will enter the space within the flange 12.

In the operation of the device, it being premised that the float is in its lowest position and the valve open, water will flow under atmospheric pressure through the pipe 4 into the lower portion of the casing, and at the same time more or less water will enter through the pipes 22 and flow downward past the valve to the cup formed by the flange 24 on the head of the float and from thence will overflow into the interior of the casing 1. During the downward passage of the water through the tube 13 it will be met by the air passing upward through the same channel and will be oxygenized to a greater or less extent, and this air will, further, pass out through the tubes 22 in contact with the incoming volume of water and thence bubble up in the water in the cistern or well to the surface and during its course will purify the water to a greater or less extent. The water will continue to rise within the chamber 1 until it reaches the openings 23 and will thence overflow into the lower portion of the cylinder 19, the weight of the water within the cylinder added to the weight of the water in the cup at the top of the cylinder being sufficient to keep the float in its lowest position. As the water continues to enter the chamber an air-cushion is formed at the top of the float at a point above the openings 23; but the weight will still resist the buoying tendency of the water, and the float will not be moved upward until the level of the water has risen to a point sufficient to cover the lower edge of the depending flange 12, and then the float will move suddenly upward and close the valve, and the flange 12 being immersed to a greater or less extent will form a perfect seal and prevent the further escape through the pipe 22. At the completion of this operation there is an air-cushion at the top of the chamber and the valve is closed. Air under suitable pressure is then forced downward through the air-pipe and enters at the lower portion of the casing at a point below the water-line and gradually bubbles up through the water, thoroughly aerating the same and gradually accumulating at the top of the chamber, forming an air-cushion of gradually-increasing volume and pressure, and the air-pressure will serve to maintain the valve in closed position and hold the float elevated after the level of liquid has lowered to a point below that at which the float was raised. As the volume of air increases the water within the chamber is forced outward through the pipe 4 and past the check-valve 9 to the water-discharge pipe 8. The water seal formed by the several flanges will prevent the escape of any of the air through the pipe 22, and so long as the cup remains up the air will be prevented from escaping from the top of the chamber, and it is only when the volume of water has been reduced to a considerable extent that the float falls and opens the valve. When this occurs, the remaining air in the chamber is free to pass outward past the valve 16 and bubble up through the body of water in the cistern or well and air the same.

In a device of this character it is possible to force water from the well, cistern, or other source of supply to any point of consumption, and all or nearly all of the air utilized as the actuating means is also forced through the water, thereby airing the same and tending to destroy any bacteria or micro-organisms with which the water may be infected.

Having thus described the invention, what is claimed is—

1. In a compressed-air water-elevator, a casing having a valved water-inlet and air-outlet near its upper end, a water-discharge pipe leading from the lower end of the casing, an air-inlet for the introduction of a volume of air for expelling the water, said air-inlet being disposed adjacent to the bottom of the casing thereby to permit the air to bubble up through the volume of water in advance of the commencement of the expelling operation, and a float for controlling the valve at the upper end of such casing.

2. In a compressed-air water-elevator, a casing having a valved water-inlet at its upper end, a valved water-discharge and air-inlet openings near its lower end, a float, and a water-containing cup carried by the float and coacting with a portion of the casing to form a water seal at the top of said casing.

3. In a compressed-air water-elevator, a casing having an opening at its upper end, a depending annular flange surrounding said opening, a float, and a vertically-disposed annular flange carried by the float and forming a water-receptacle.

4. In a compressed-air water-elevator, a casing having an inlet-opening at its upper end, a depending annular flange surrounding said opening, a float, a collar or flange carried thereby and of a diameter less than that of the depending flange, substantially as specified.

5. In a compressed-air water-elevator, a casing having at its upper end a threaded collar provided with a depending annular flange, a threaded valve-casing carried by the collar, said casing having a valve-seat, a float having a vertically-disposed annular flange disposed within the depending flange, and a valve secured to the float and adapted to close against said seat.

6. In a compressed-air water-elevator, the combination with a casing having at its upper end a water-inlet and air-outlet opening, a valve for closing said opening, and a hollow perforated float carrying the valve.

7. In a compressed-air water-elevator, a casing having at its upper end a water-inlet and air-outlet opening, a valve for closing said opening, and a hollow float carrying the valve, said float being provided at an intermediate portion of its length with a plurality of perforations for the entrance of water to the interior of the float.

In testimony that I claim the foregoing as my own I have hereto affixed my signature in the presence of two witnesses.

JOHN WESLEY CARPENTER.

Witnesses:
PAUL L. MILLER,
P. W. RINKER.